(12) United States Patent
Dalal et al.

(10) Patent No.: US 7,467,257 B1
(45) Date of Patent: Dec. 16, 2008

(54) IDENTIFICATION OF STORAGE TO ACQUIRE TO MAINTAIN THE INTENT OF LOGICAL VOLUMES

(75) Inventors: Chirag Deepak Dalal, Maharashtra (IN); Vaijayanti Rakshit Bharadwaj, Sunnyvale, CA (US)

(73) Assignee: Symantec Operating Corporation, Cupertino, CA (US)

( * ) Notice: Subject to any disclaimer, the term of this patent is extended or adjusted under 35 U.S.C. 154(b) by 362 days.

(21) Appl. No.: 10/812,322

(22) Filed: Mar. 29, 2004

(51) Int. Cl.
*G06F 12/00* (2006.01)
(52) U.S. Cl. ................................ 711/114; 711/154
(58) Field of Classification Search .............. 711/154
See application file for complete search history.

(56) References Cited

U.S. PATENT DOCUMENTS

| | | | |
|---|---|---|---|
| 5,440,737 A | 8/1995 | Uchinuma | 395/600 |
| 5,897,661 A | 4/1999 | Baranovsky et al. | 711/170 |
| 6,058,489 A | 5/2000 | Schultz et al. | 714/7 |
| 6,078,990 A | 6/2000 | Frazier | 711/114 |
| 6,457,139 B1 | 9/2002 | D'Errico et al. | 711/114 |
| 6,519,679 B2 | 2/2003 | Devireddy et al. | 711/114 |
| 6,834,299 B1 | 12/2004 | Hamilton, II et al. | 709/220 |
| 6,904,599 B1 | 6/2005 | Cabrera et al. | 719/328 |
| 2002/0087780 A1 | 7/2002 | Selkirk et al. | 711/6 |
| 2002/0133539 A1 | 9/2002 | Monday | 709/203 |
| 2003/0005119 A1 | 1/2003 | Mercier et al. | 709/225 |
| 2003/0046270 A1 | 3/2003 | Leung et al. | 707/1 |
| 2003/0074528 A1* | 4/2003 | Soejima et al. | 711/114 |
| 2003/0093619 A1 | 5/2003 | Sugino et al. | 711/114 |
| 2003/0200109 A1 | 10/2003 | Honda et al. | 705/1 |
| 2003/0229698 A1 | 12/2003 | Furuhashi et al. | 709/226 |
| 2003/0233518 A1 | 12/2003 | Yamagami et al. | 711/114 |

OTHER PUBLICATIONS

*VERITAS Volume Manager 3.5: User's Guide—VERITAS Enterprise Administrator*, VERITAS Software Corporation, Jul. 2002, pp. i-118, http://www.filibeto.org/sun/lib/nonsun/veritas/vxvm/3.5/248612.pdf.
*VERITAS Volume Manager 3.1: Administrator's Guide*, VERITAS Software Corporation, Aug. 2000, pp. 1-266.
Alvarez, Guillermo A., et al., MINERVA: *An Automated Resource Provisioning Tool for Large-Scale Storage Systems*, Hewlett-Packard Laboratories, ACM Transactions on Computer Systems, vol. 19, No. 4, Nov. 2001, pp. 483-518.
Tanenbaum, Andrew S., Hardware, Software, and Multilevel Machines, Structured Computer Organization, Second Edition, 1984 Prentice-Hall, Inc. pp. 10-12.

(Continued)

*Primary Examiner*—Reginald G. Bragdon
*Assistant Examiner*—Thanh D Vo
(74) *Attorney, Agent, or Firm*—Campbell Stephenson LLP (57) ABSTRACT

A method, system, computer system, and computer program product to specify the particular characteristics of hardware to acquire to enable a logical volume to be maintained in accordance with the purpose for which the logical volume was created. In response to a command to perform an operation on a logical volume, existing storage that can be used to perform the operation is identified. If the existing storage is insufficient to perform the operation, a specification is developed for the additional storage to acquire to enable the operation to be performed successfully. Connectivity of the additional storage is also specified to storage objects in the existing logical volume so that the newly-acquired resources can be used for their intended purpose when acquired.

27 Claims, 8 Drawing Sheets

OTHER PUBLICATIONS

Computer Dictionary, Third Edition, 1997 Microsoft Press, p. 176 (definition of engine).

"Intelligent Storage Provisioning for UNIX and LINUX Environments" by Mike Dutch, 2005 VERITAS Corporation.

* cited by examiner

IDENTIFICATION OF STORAGE TO ACQUIRE TO MAINTAIN THE INTENT OF LOGICAL VOLUMES

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, magnetic disks, optical disks, and other types of storage devices.

Today, storage area networks (SANs) can be used to provide hundreds of storage devices for use by several hosts. Allocating storage devices for use by a particular application program can be a difficult task when the storage devices are provided via a SAN. One approach to making storage devices easier to use and configure is to create an abstraction that enables storage to be viewed in terms of logical storage devices, rather than in terms of the physical devices themselves. For example, physical devices can be logically combined into a single logical storage device that provides the storage capacity of the combined physical storage devices. Such logical storage devices are referred to herein as "logical volumes." Logical volumes are abstractions consisting of a set of logical memory blocks that store data. While it is said that logical memory blocks store data, in reality the data is stored in physical memory blocks of the underlying physical devices (e.g., hard disks) allocated directly or indirectly to the logical volume.

Configuring a logical volume is a complex task when tradeoffs between performance, reliability, and cost are taken into account. A storage administrator must keep track of how particular volumes are implemented so that subsequent reconfigurations of a logical volume do not render the logical volume unsuitable for the purpose for which the logical volume was created. Operations such as increasing the size of a logical volume, evacuating data from the logical volume, or moving a logical volume to a different physical location involve identifying additional or alternative storage for a logical volume that also conforms to the purpose for which the logical volume was intended. Previously, this process has largely been performed manually by storage administrators and is subject to error.

To further complicate storage management issues, the storage provisioning process is typically separate from the daily operational environment, and large quantities of storage devices having particular characteristics are purchased en masse. Unfortunately, the needs of particular logical volumes may be unmet if information about the types of devices needed to meet those needs is not provided as input to the provisioning process.

A solution is needed that specifies characteristics of resources (e.g., physical storage devices) that must be acquired to enable the intent of a logical volume to be consistently maintained. These characteristics can be provided as input to the storage provisioning process. Preferably, the solution should be automated and based upon the stored intent of the logical volume. The solution would ideally specify connectivity of the identified resources to storage objects in an existing logical volume so that the newly-acquired resources can be used for their intended purpose.

SUMMARY OF THE INVENTION

The present invention provides a method, system, computer system, and computer program product to specify the particular characteristics of hardware to acquire to enable a logical volume to be maintained in accordance with the purpose for which the logical volume was created. Maintaining a logical volume can involve provisioning additional space for many types of operations, such as increasing the size of the logical volume, evacuating data from the logical volume, relocating the data for the logical volume, and so on. In response to a command to perform an operation on a logical volume, existing storage that can be used to perform the operation is identified. If the existing storage is insufficient to perform the operation, a specification is developed for the additional storage to acquire to enable the operation to be performed successfully. Connectivity of the additional storage is also specified to storage objects in the existing logical volume so that the newly-acquired resources can be used for their intended purpose when acquired. Existing storage can also be reserved to be used in conjunction with the newly-acquired resources when the newly-acquired resources become available.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

TERMINOLOGY

Data storage for a logical volume may take form as groups of one or more physical devices, such as one or more dynamic or static random access storage devices, one or more magnetic or optical data storage disks, or one or more other types of storage devices. A physical storage device may be divided into multiple storage regions or blocks that can be used to store data. The term "storage region" is used herein to generically describe data storage, whether that data storage is formed from a set of blocks on a storage device, the entire storage device, or a combination of storage devices. One of skill in the art will recognize that the systems and processes described herein are applicable to all types of data storage and that the use of the term "storage device" or "storage region" is not intended to be limiting.

The term "portion" may include all or only some and not all of the described entity. Similarly, the term "set," when used with reference to an entity, may include one or more entities. The term "subset" of a set of entities may include only one, some but not all, or all of the entities in the set.

INTRODUCTION

Today, with the proliferation of intelligent disk arrays, the storage devices available in a disk array provide many features. Through SANs, hosts now have access to hundreds of thousands of storage devices having a variety of properties. Because of these factors, configuring logical volumes in a given environment is no longer a trivial problem.

A solution has been developed by Veritas Software Corporation of Mountain View, Calif. for preserving the configuration intent of a logical volume. This solution is described in co-pending application Ser. No. 10/324,858, which is now U.S. Pat. No. 7,143,259, filed on Dec. 20, 2002, entitled "Preservation Of Intent Of A Volume Creator With A Logical Volume" and naming Chirag Deepak Dalal, Vaijayanti Rakshit Bharadwaj, Pradip Madhukar Kulkarni, and Ronald S. Karr as inventors, the application being incorporated herein by reference in its entirety.

In application Ser. No. 10/324,858, the creator of a logical volume defines certain characteristics or requirements for the logical volume, such as the number of copies of data to be maintained, the level of performance required of the logical volume, or a requirement that one or more snapshots of the logical volume can be preserved representing the data at different points in time. In response to the user's requirements, the system explores the possibilities for meeting the characteristics or requirements in the existing storage environment. The system then implements the logical volume and stores the intent, along with a corresponding set of rules for configuring the logical volume, with the logical volume. As a result, volume management operations like resizing the volume and evacuating data from the volume use the rules to preserve the intent of the creator.

A logical volume is a virtual disk device that includes one or more physical disks. A logical volume appears to file systems, databases, and other application programs as a physical disk, although the logical volume does not have the limitations of a physical disk. A physical disk is often described as made up of subdisks (which are contiguous storage regions on a disk), and data can be organized on a set of subdisks to form a plex (a copy of the data). A plex can be formed by concatenating the data, striping the data, mirroring the data, or striping the data with parity.

Alternative storage configurations and equivalent logical volume configuration trees are described in detail in co-pending patent application Ser. No. 10/724,245, filed on Nov. 28, 2003, entitled "Identification for Reservation of Replacement Storage Devices for a Logical Volume to Satisfy its Intent" and naming Chirag Deepak Dalal, Vaijayanti Rakshit Bharadwaj, and Vivek Gupta as inventors, the application being incorporated herein by reference in its entirety. This application identifies existing storage that can be reserved to ensure that a logical volume has sufficient storage devices to draw from when additional devices are needed.

The present invention builds upon the concept of preserved intent for logical volumes to enhance the storage provisioning process. By identifying the storage needed to add to a data center to perform particular operations while maintaining the intent of logical volumes, storage administrators can plan more accurately for future growth and support of data centers.

Figure 1:
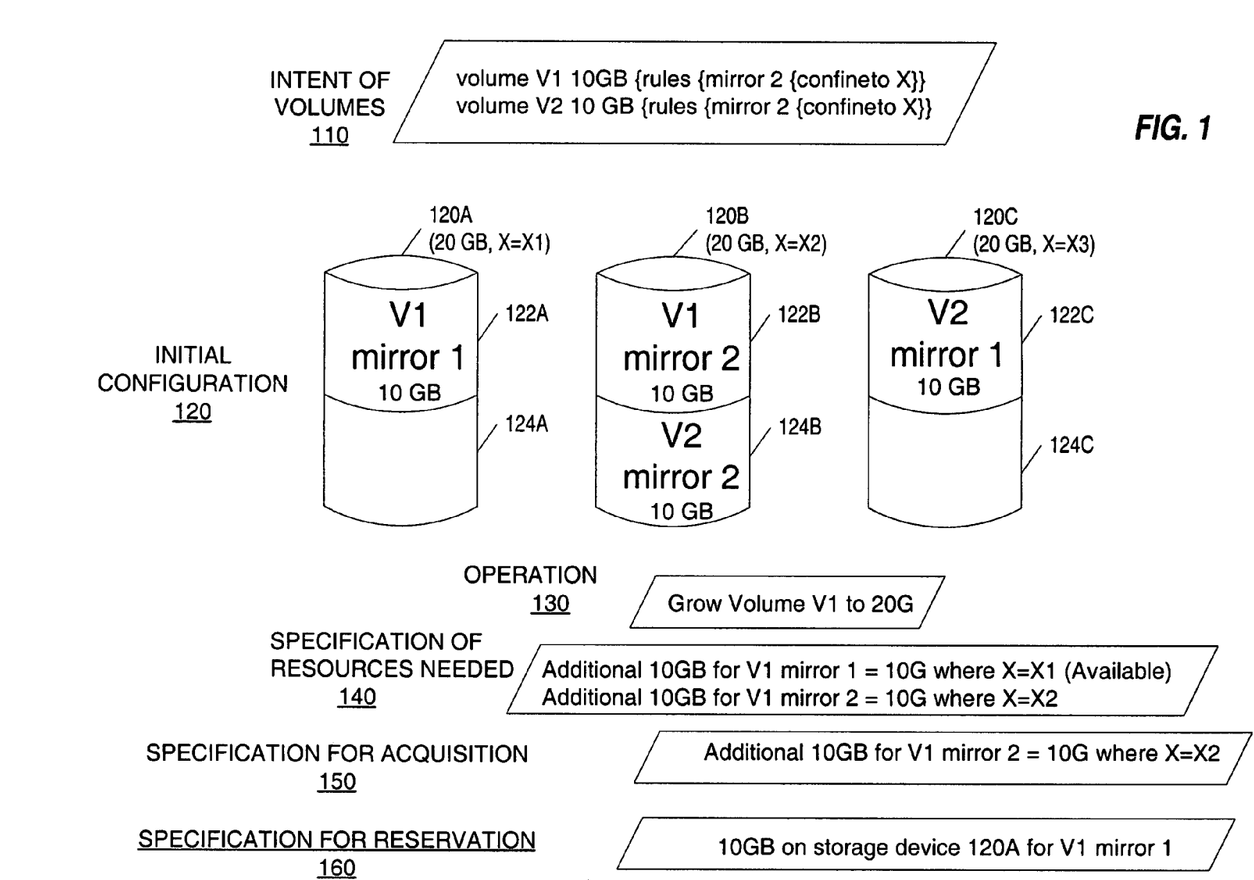
FIG. 1 is a diagram showing examples of logical volumes and their intent, an initial configuration of the logical volumes in a given hardware environment, a requested operation, a specification of resources needed to perform the operation, a specification for acquisition of resources that cannot be satisfied with the available hardware, and, if applicable, a specification for reservation of resources that can be satisfied with the available hardware.

FIG. 1 is a diagram showing examples of logical volumes and their intent, an initial configuration of the logical volumes in a given hardware environment, a requested operation, a specification of resources needed to perform the operation, a specification for acquisition of resources that cannot be satisfied with the available hardware, and, if applicable, a specification for reservation of resources that can be satisfied with the available hardware. The environment includes three 20-gigabyte storage devices, each having a different value for the attribute X. Storage device 120A has respective 10-gigabyte storage regions 122A and 124A, each of which is a contiguous set of blocks of storage device 120A, and an attribute value of X=X1. Storage device 120B has 10 gigabyte storage regions 122B and 124B, and an attribute value of X=X2, and 20 gigabyte storage device 120C has 10 gigabyte storage regions 122C and 124C, and an attribute value of X=X3.

Intent of Volumes 110 shows the intent for two logical volumes V1 and V2. Each of logical volumes V1 and V2 is to be created with two mirrors, as indicated by the "rules {mirror 2 {confineto X}}" clause; i.e., two copies of the data will be simultaneously updated and each mirror is to be confined to storage having a common value for the attribute X. For further information about the syntax of a language used herein for expressing storage allocation requirements, refer to co-pending application Ser. No. 10/327,558, filed on Dec. 20, 2002, entitled "A Language for Expressing Storage Allocation Requirements" and naming Chirag Deepak Dalal, Vaijayanti Rakshit Bharadwaj, Pradip Madhukar Kulkarni, and Ronald S. Karr as inventors, the application being incorporated herein by reference in its entirety.

In FIG. 1, the 'confineto "X"' clause indicates that each storage object following this rule should be allocated on storage having the same value of attribute X. A mirror implemented using this rule, referred to here as V1 mirror 1, is allocated from storage where each storage region has the same value of X (X=X1 in this example) in storage region 122A of storage device 120A, as shown in initial configuration 120. The second mirror, referred to here as V1 mirror 2, is also allocated from storage where each storage region has the same value of X—this value can be different from X1 (X=X2 in this example) and is on a different storage device from mirror 1. V1 mirror 2 is stored in storage region 122B of storage device 120B.

In FIG. 1, operation 130 indicates that volume V1 is to be increased in size to 20 gigabytes (twice the current size of 10 gigabytes). Therefore, each of mirror 1 and mirror 2 must increase in size to 20 gigabytes. Resources Needed 140 indicates that an additional 10 gigabytes is needed for V1 mirror 1, where the value of the attribute X must be X1. Similarly, an additional 10 gigabytes is needed for V1 mirror 2, where the value of the attribute X must be X2. In this example and in the examples that follow, Resources Needed 140 is expressed as a text description of the resources, although it is within the scope of the invention that the resources needed can be expressed as a logical volume configuration tree or in another form.

Examining the current storage environment, it can be seen that the 10 gigabytes needed for V1 mirror 1, where the value of the attribute X must be X1, are available on storage device 120A storage region 124A. However, the additional 10 gigabytes needed for V1 mirror 2, where the value of the attribute X must be X2, are not available. Storage device 120B has 20 gigabytes of space, but the space is already being used for one of the mirrors for volume V1 and one of the mirrors for volume V2. Even though storage device 120C storage region 124C has 10 gigabytes of free space, the value of X is X3 and is not suitable for increasing the size of V1 mirror 2. Therefore, Specification for Acquisition 150 specifies that an additional 10 gigabytes must be acquired to perform the operation of increasing the size of volume V1 to 20 gigabytes. In this example and in the examples that follow, Specification for Acquisition 150 is expressed as text, although it is within the scope of the invention that the resources to be acquired can be expressed as a logical volume configuration tree or in another form. Specification for Reservation 160 indicates the storage that can be reserved to perform the operation; in this example, the 10 gigabytes on storage device 120A are specified as reserved for V1 mirror 1.

Figure 2:
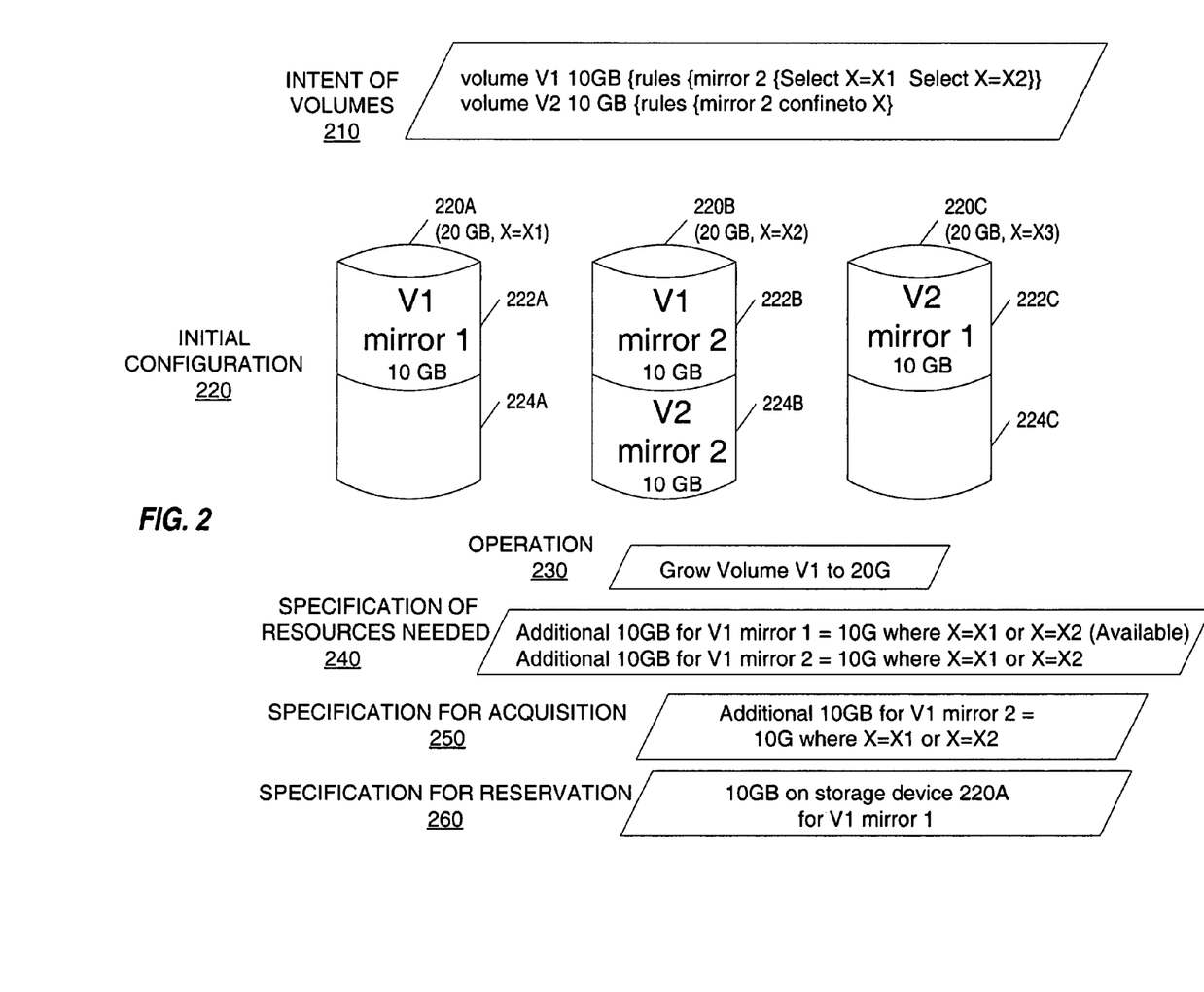
FIG. 2 is a diagram showing another example of logical volumes and their intent, an initial configuration of the logical volumes in a given hardware environment, a requested operation, a specification of resources needed to perform the operation, a specification for acquisition of resources that cannot be satisfied with the available hardware, and, if applicable, a specification for reservation of resources that can be satisfied with the available hardware.

FIG. 2 is a diagram showing another example of logical volumes and their intent, an initial configuration of the logical volumes in a given hardware environment, a requested operation, a specification of resources needed to perform the operation, a specification for acquisition of resources that cannot be satisfied with the available hardware, and, if applicable, a specification for reservation of resources that can be satisfied with the available hardware. The environment includes three 20-gigabyte storage devices, each having a different value for the attribute X. Storage device 220A has respective 10-gigabyte storage regions 222A and 224A, each of which is a contiguous set of blocks of storage device 220A, and an attribute value of X=X1. Storage device 220B has 10 gigabyte storage regions 222B and 2124B, and an attribute value of X=X2, and 20 gigabyte storage device 2120C has 10 gigabyte storage regions 222C and 224C, and an attribute value of X=X3. Initial configuration 220 shows v1 mirror 1 on storage device 220A storage region 222A, v1 mirror 2 on storage device 220B storage region 222B, v2 mirror 1 on storage device 220C storage region 222C, and v2 mirror 2 on storage device 220B storage region 224B.

In this example, Intent of Volumes 210 has the following rule for volume V1:

rules {
mirror 2 {
select "X"="X"
select "X"="X2"
}
}

This rule indicates that each of the mirrors for volume V1, V1 mirror 1 and V1 mirror 2, should be allocated from storage having either a value of X1 or X2 as the value for attribute X. Operation 230 indicates that volume V1 is to be increased in size to 20 gigabytes. Resources Needed 240 indicates that an additional 10 gigabytes is needed for V1 mirror 1, where the value of the attribute X can be either X1 or X2. Similarly, an additional 10 gigabytes is needed for V1 mirror 2, where the value of the attribute X can be either X1 or X2.

Examining the current storage environment, it can be seen that the 10 gigabytes needed for V1 mirror 1, where the value of the attribute X can be either X1 or X2, are available on storage device 120A storage region 124A. However, the additional 10 gigabytes needed for V1 mirror 2, where the value of the attribute X can be either X1 or X2, are not available. Storage device 120B has 20 gigabytes of space, but the space is already being used for one of the mirrors for volume V1 and one of the mirrors for volume V2. Even though storage device 120C storage region 124C has 10 gigabytes of free space, the value of X is X3 and is not suitable for increasing the size of either V1 mirror 1 or V1 mirror 2. Therefore, the Specification for Acquisition 150 specifies that an additional 10 gigabytes must be acquired to perform the operation of increasing the size of volume V1 to 20 gigabytes. The newly-acquired storage will be used for V1 mirror 2, and the value of X for the additional storage can be either X1 or X2. Specification for Reservation 160 specifies that 10 gigabytes on storage device 220A can be reserved to perform the operation for V1 mirror 1.

Figure 3:
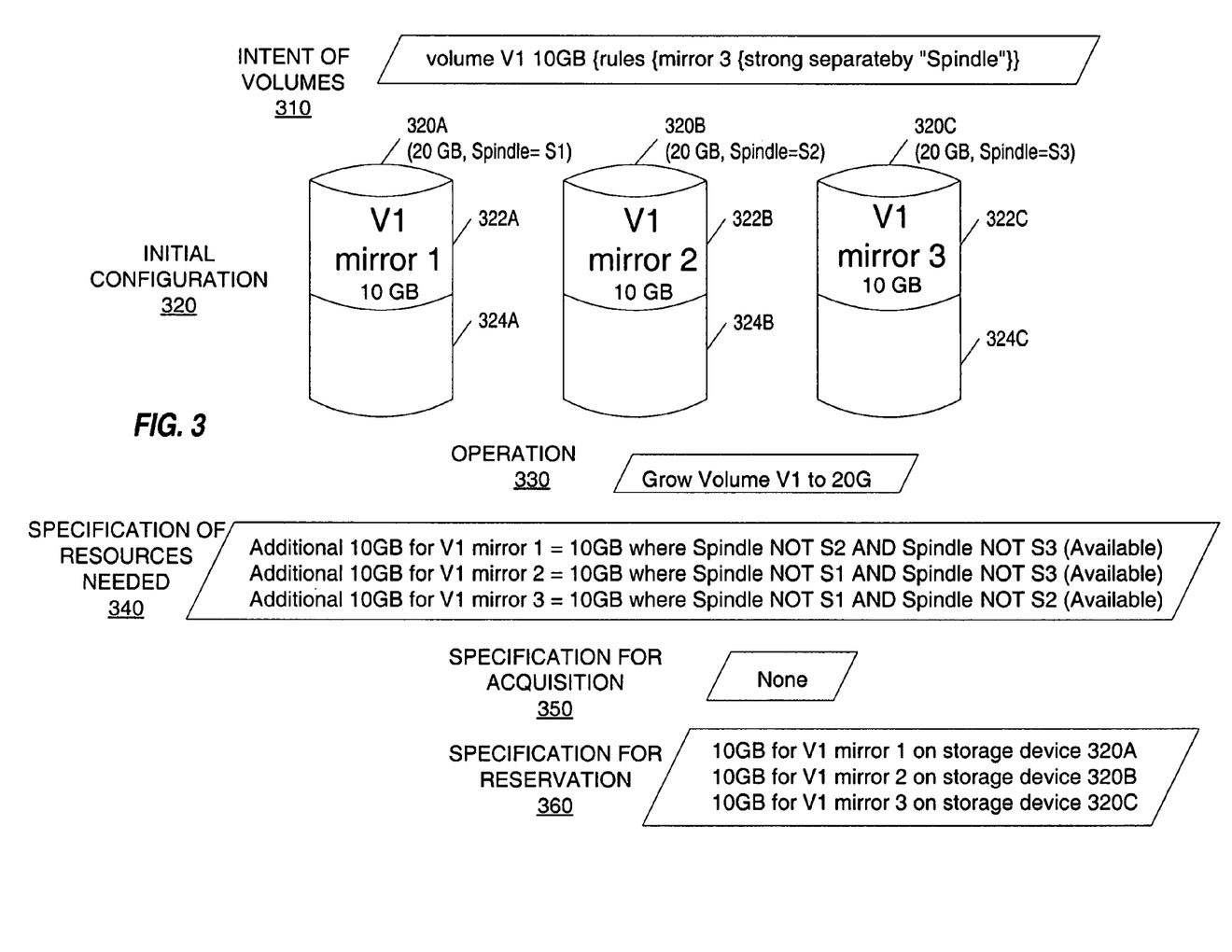
FIG. 3 is a diagram showing another example of a logical volume and its intent, an initial configuration of the logical volumes in a given hardware environment, a requested operation, a specification of resources needed to perform the operation, a specification for acquisition of resources that cannot be satisfied with the available hardware, and, if applicable, a specification for reservation of resources that can be satisfied with the available hardware.

FIG. 3 is a diagram showing another example of a logical volume and its intent, an initial configuration of the logical volumes in a given hardware environment, a requested operation, a specification of resources needed to perform the operation, a specification for acquisition of resources that cannot be satisfied with the available hardware, and, if applicable, a specification for reservation of resources that can be satisfied with the available hardware. In many environments, a policy exists that storage objects such as mirrors in a mirrored volume or columns in a RAID-4 and RAID-5 volume should not share the same physical storage spindle. This limitation ensures that if one spindle fails, only one storage object is affected. Such a limitation is indicated through the following rule:

mirror M {
strong separateby "Spindle"
}

A brief explanation of the syntax for the "strong separateby X" clause follows:

1. A storage object can be placed on storage that has a value (Xn) of attribute X. Xn can be a set of values of X.
2. A different storage object can be placed on storage that has the value (Xm) of attribute X. Xm can be a set of values of X.
3. Storage objects having any value from the set Xn cannot have any value from set Xm.

In FIG. 3, Intent of Volumes 310 includes a "strong separateby" clause with a value of 3 for M, indicating three mirrors. In the example of FIG. 3, initial configuration 310 shows that each of V1 mirror 1, V1 mirror 2, and V1 mirror 3 is allocated on a respective spindle, S1, S2 and S3. V1 mirror 1 is stored on storage device 320A storage region 322A, v1 mirror 2 on storage device 320B storage region 322B, and v1 mirror 3 on storage device 320C storage region 322C.

Operation 330 indicates that volume V1 should be increased in size to 20 gigabytes. Resources Needed 340 indicates that an additional 10 gigabytes is needed for V1 mirror 1, and the additional 10 gigabytes cannot be from spindle S2 or spindle S3. Because an additional 10 gigabytes are available on storage device 120A in storage region 124A on spindle S1, the space required for V1 mirror 1 is available.

Similarly, an additional 10 gigabytes is needed for V1 mirror 2, and the additional 10 gigabytes cannot be from spindle S1 or spindle S3. Because an additional 10 gigabytes are available on storage device 120B in storage region 124B on spindle S2, the space required for V1 mirror 2 is available. In addition, an additional 10 gigabytes are needed for V1 mirror 3, and the additional 10 gigabytes cannot be from spindle S1 or spindle S2. Because an additional 10 gigabytes are available on storage device 120C in storage region 124C on spindle S3, the space required for V1 mirror 3 is available.

Because the resources needed for each of mirrors 1, 2, and 3 are available, no additional resources are needed to grow volume V1 to 20 gigabytes given the initial configuration 320. Specification for Acquisition 350 therefore has a value of 'none.' Specification for Reservation 360 reserves 10 gigabytes on each of storage devices 320A, 320B, and 320C for V1 mirror 1, 2, and 3, respectively.

Figure 4:
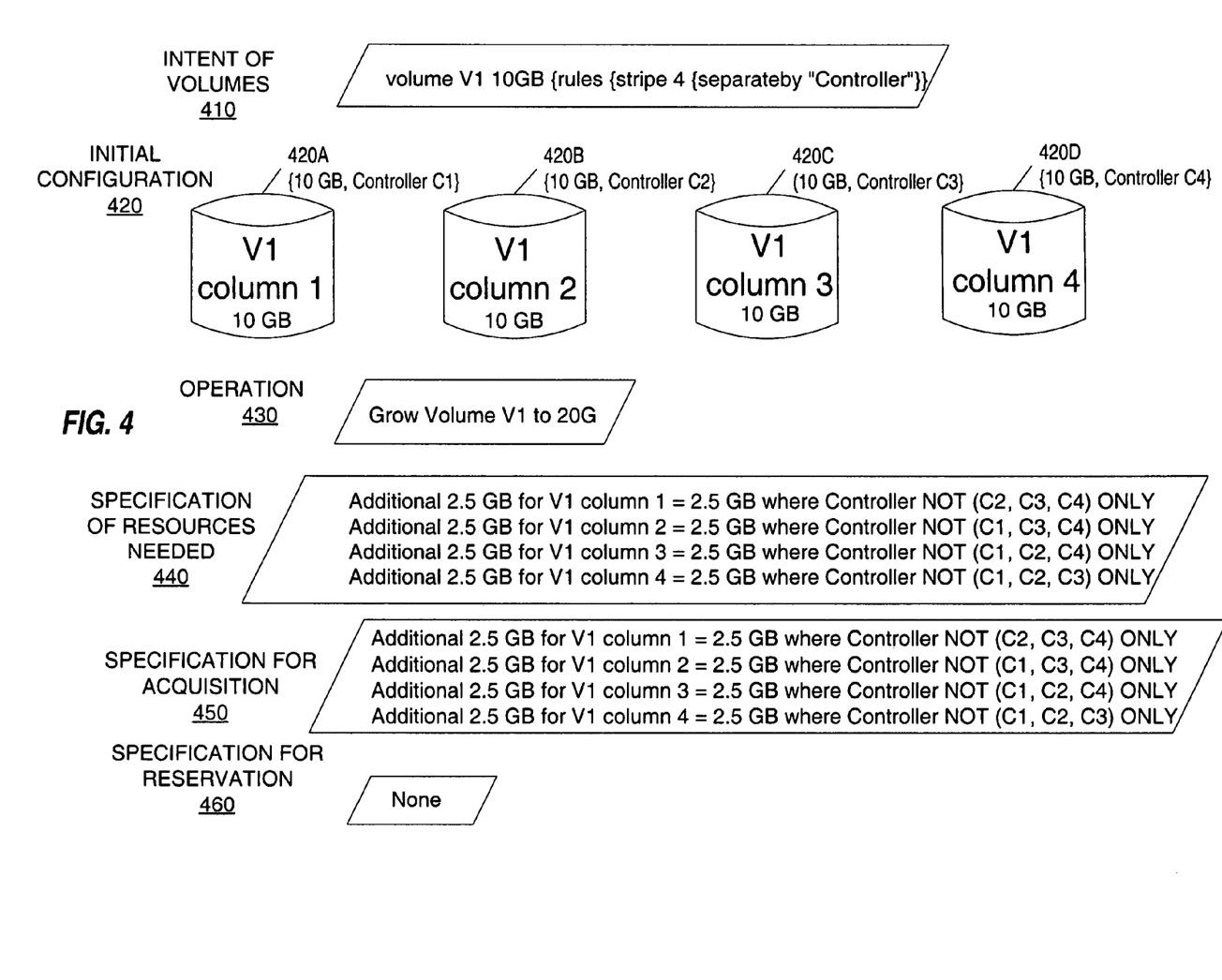
FIG. 4 is a diagram showing another example of a logical volume and its intent, an initial configuration of the logical volumes in a given hardware environment, a requested operation, a specification of resources needed to perform the operation, a specification for acquisition of resources that cannot be satisfied with the available hardware, and, if applicable, a specification for reservation of resources that can be satisfied with the available hardware.

FIG. 4 is a diagram showing another example of a logical volume and its intent, an initial configuration of the logical volumes in a given hardware environment, a requested operation, a specification of resources needed to perform the operation, a specification for acquisition of resources that cannot be satisfied with the available hardware, and, if applicable, a specification for reservation of resources that can be satisfied with the available hardware. The environment includes four different storage devices 420A, 420B, 420C, and 420D of 10 gigabytes each.

In many environments, storage objects such as mirrors in a mirrored volume or columns in a RAID-4 and RAID-5 volume should withstand failure of a controller. This limitation ensures that if one controller fails, only one storage object is affected. Such a limitation can be expressed as a "separateby" clause, the syntax of which is explained below:

1. A storage object can be placed on storage that has a value (Xn) of attribute X. Xn can be a set of values of X.
2. A different storage object can be placed on storage that has the value (Xm) of attribute X. Xm can be a set of values of X.
3. The sets, Xn and Xm, should not share any members. Xn∩Xm=[ ].

In the example of FIG. 4, a 10 G logical volume consists of 4 columns, and columns are separated by the "Controller" variable. The following rule from Intent of Volumes 410 indicates this configuration:

rules {
stripe 4 {
separateby "Controller"
}
}

Each column of the logical volume V1 is allocated on storage under control of a different controller. Initial configuration 420 shows that Column C1 lies on Controller c1, Column C2 lies on Controller c2, Column C3 lies on Controller c3, and Column C4 lies on Controller c4. Each column uses all available storage space (10 gigabytes) on the respective storage devices 420A, 420B, 420C, and 420D. Such a configuration with each column on a different controller improves performance.

Operation 430 indicates that the volume is to be increased in size to 20 gigabytes. Therefore, an additional 10 gigabytes of storage is to be distributed among the four columns. Resources Needed 440 indicates that Column C1 needs an additional 2.5 gigabytes, and the disks providing that 2.5 gigabytes should not be solely under the control of Controllers c2, c3 and c4. If the data for two different columns lie on the same controller, performance may suffer. Either the disks should be under the control of controller c1 or under the control of another controller that does not control a column.

Similarly, resources 440 indicates that Column C2 needs an additional 2.5 gigabytes, which should not be solely under the control of controllers C1, C3 and C4; Column C3 needs an additional 2.5 gigabytes, which should not be solely under the control of controllers C1, C2 and C4; and Column C4 needs an additional 2.5 gigabytes, which should not be solely under the control of controllers C1, C2 and C3.

Figure 5:
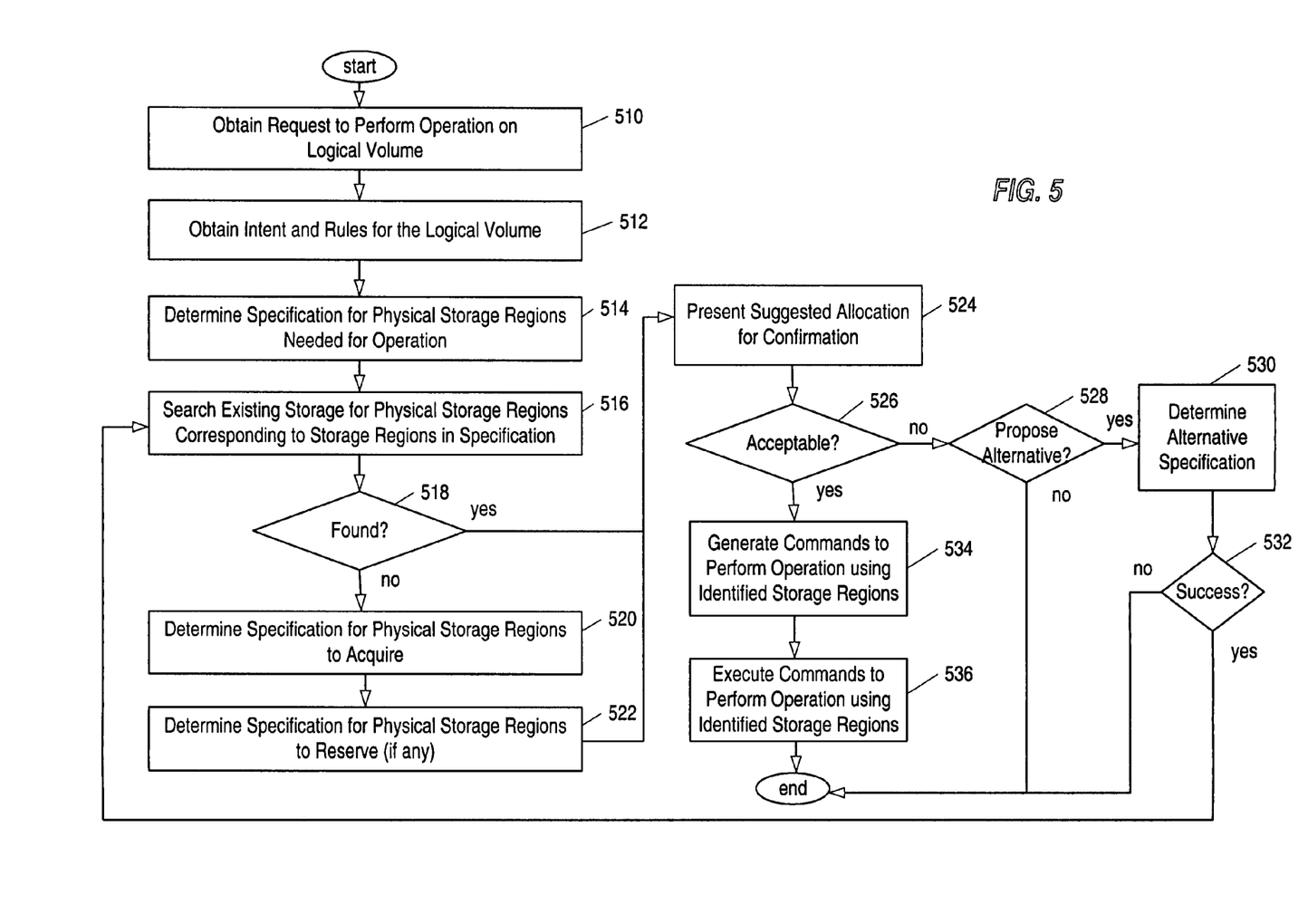
FIG. 5 is a flowchart of one embodiment of a method for identifying resources to acquire to maintain the intent of a logical volume.

FIG. 5 is a flowchart of one embodiment of a method for identifying resources to acquire to maintain the intent of a logical volume. In "Obtain Request to Perform Operation on Logical Volume" step 510, a request to perform an operation is acquired. Examples of such operations were given in FIGS. 1 through 4 in operations 130, 230, 330, and 430, respectively. It is envisioned that an administrator may specify several possible operations to examine different scenarios for allocating resources in accordance with business objectives of the data center.

In "Obtain Intent and Rules of the Logical Volume" step 512, the intent and rules associated with the logical volume are obtained. The intent and rules of a logical volume are explained in further detail in application Ser. No. 10/324,858 described above. Control proceeds to "Determine Specification for Physical Storage Regions Needed for Operation" step 514. In the embodiments described in the cross-referenced patent applications above, the specification is produced in the form of a logical volume configuration tree, although the form of the specification can be varied. The specification can include attributes of storage objects, which may include particular attribute values, quantity of storage space needed, and so on. In one embodiment, a "dummy storage object" is defined. Initially, the dummy storage object has no attributes and an infinite length (quantity of storage). These attribute values are initialized when examining the intent and rules for the logical volume in light of the operation to be performed.

From "Determine Specification for Physical Storage Regions Needed for Operation" step 514, control proceeds to "Search Existing Storage for Physical Storage Regions Corresponding to Storage Regions in Specification" step 516. The existing storage is searched for a physical storage region corresponding to each storage region specified in the specification. Control then proceeds to "Found" decision point 518.

If all physical storage regions needed to perform the operation are not found in the existing storage at "Found" decision point 518, control proceeds to "Determine Specification for Physical Storage Regions to Acquire" step 520. A specification such as one of Specification for Acquisition 150, 250, 350, or 450 of FIGS. 1-4 is determined. This step is discussed in further detail with reference to FIG. 6. From "Determine Specification for Physical Storage Regions to Acquire" step 520, control proceeds to "Determine Specification for Physical Storage Regions to Reserve (if any)" step 522. In this step, a specification such as one of Specification for Reservation 160, 260, 360, or 460 of FIGS. 1-4 is determined.

Once a Specification for Acquisition and a Specification for Reservation are determined, the allocation engine has completed allocating resources for performing the operation on the logical volume. Several different allocations of resources may be possible to perform a given operation in a particular storage environment. Steps 524 through 532 of FIG. 5 show one embodiment of the invention that allows the storage administrator to examine alternative allocation scenarios before selecting a resource allocation to implement. One of skill in the art will recognize that these steps are for illustration purposes only and are not necessary for operation of the invention.

From "Determine Specification for Physical Storage Regions to Reserve (if any)" step 522, control proceeds to "Present Suggested Allocation for Confirmation" step 524. In this step, the particular specifications for acquiring and reserving resources can be presented to a user via a user interface. Control proceeds to "Acceptable" decision point 526, where the user indicates whether the suggested allocation is acceptable. If the suggested allocation is not acceptable, control proceeds to "Propose Alternative" decision point 528. If the user wishes to examine an alternative allocation, control proceeds to "Determine Alternative Specification" step 530. If the user does not wish to examine an alternative allocation, the process ends without allocating resources to perform the operation.

At "Determine Alternative Specification" step 530, an alternative specification of physical storage regions needed for the operation is determined, if possible. Control proceeds to "Success" decision point 532. If another specification was successfully determined, control returns to "Search Existing Storage for Physical Storage Regions Corresponding to Storage Regions in Specification" step 516 to determine whether existing storage can be found corresponding to each storage region in the alternative specification. If another specification was not successfully determined, the process ends without allocating resources to perform the operation.

At "Acceptable" decision point 526, if the suggested allocation of resources is acceptable for performing the operation, control proceeds to "Generate Commands to Perform Operation using Identified Storage Regions" step 534. Commands are generated to perform the operation using the identified storage regions, as described in further detail in patent application Ser. No. 10/324,858 described above. Control then proceeds to "Execute Commands to Perform Operation using Identified Storage Regions" step 536. The commands are executed to perform the operation using the identified storage regions, and the operation is complete.

Figure 6:
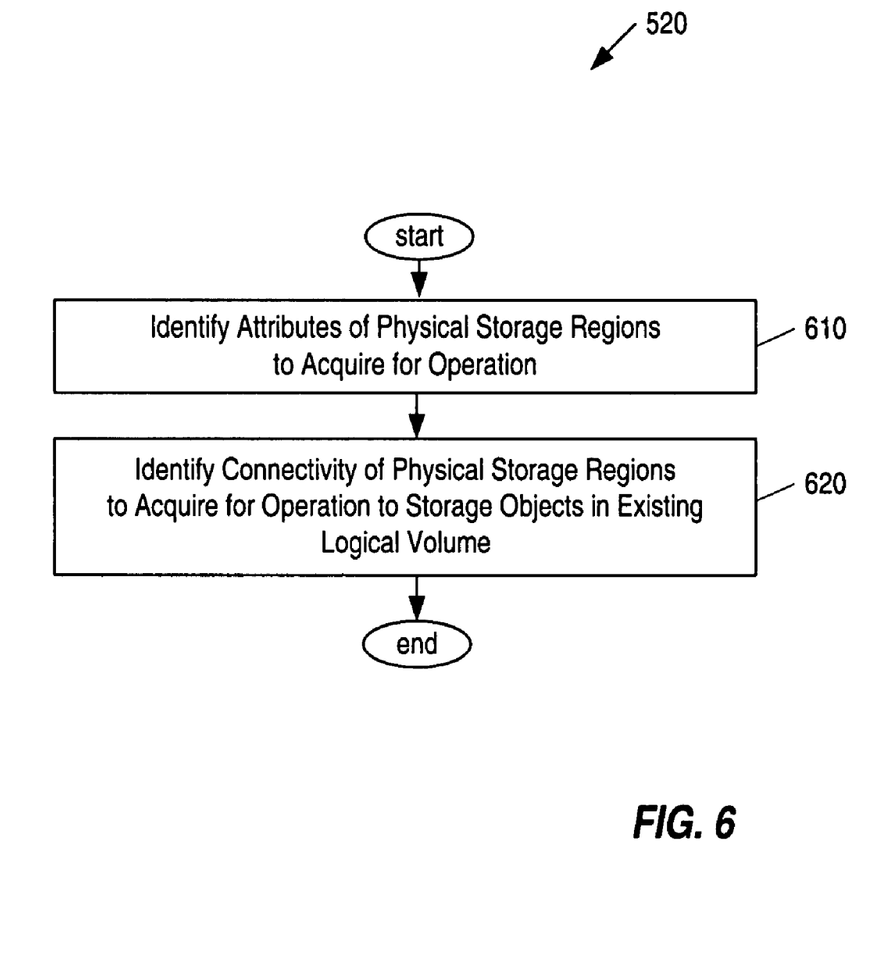
FIG. 6 is a flowchart of one embodiment of the "Determine Specification for Physical Storage Regions to Acquire" step of the flowchart of FIG. 5.

FIG. 6 is a flowchart of one embodiment of the "Determine Specification for Physical Storage Regions to Acquire" step 520 of the flowchart of FIG. 5. In "Identify Attributes of Physical Storage Regions to Acquire for Operation" step 610, attributes of the physical storage regions to be acquired are determined. These characteristics include values for particular attributes, quantity of storage space needed, and so on, that must be added to the existing storage environment. Characteristics of physical storage regions that are already present and can be allocated to perform the operation are not added to the specification of storage to acquire.

Control then proceeds to "Identify Connectivity of Physical Storage Regions to Acquire for Operation to Storage Objects in Existing Logical Volume" step 620. As explained in the examples above with reference to FIGS. 1 through 4, the particular storage objects to which storage is to be allocated are identified, along with the quantity to be allocated for each storage object. For example, the particular quantity of storage space from each acquired storage region to be allocated for each mirror or column can be specified.

Figure 7A:
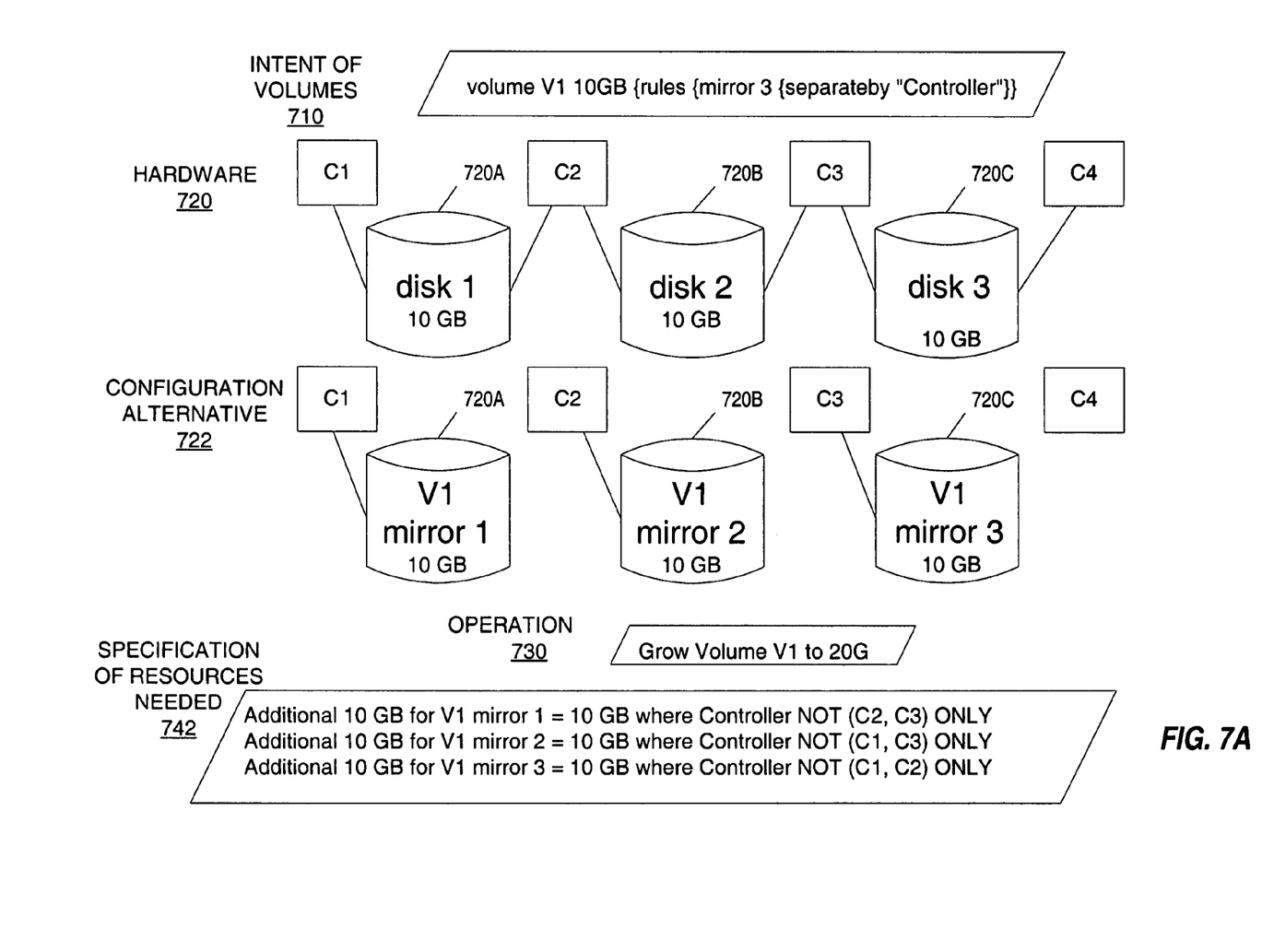
FIGS. 7A and 7B show an example of alternative specifications of resources to perform the same operation.
Figure 7B:
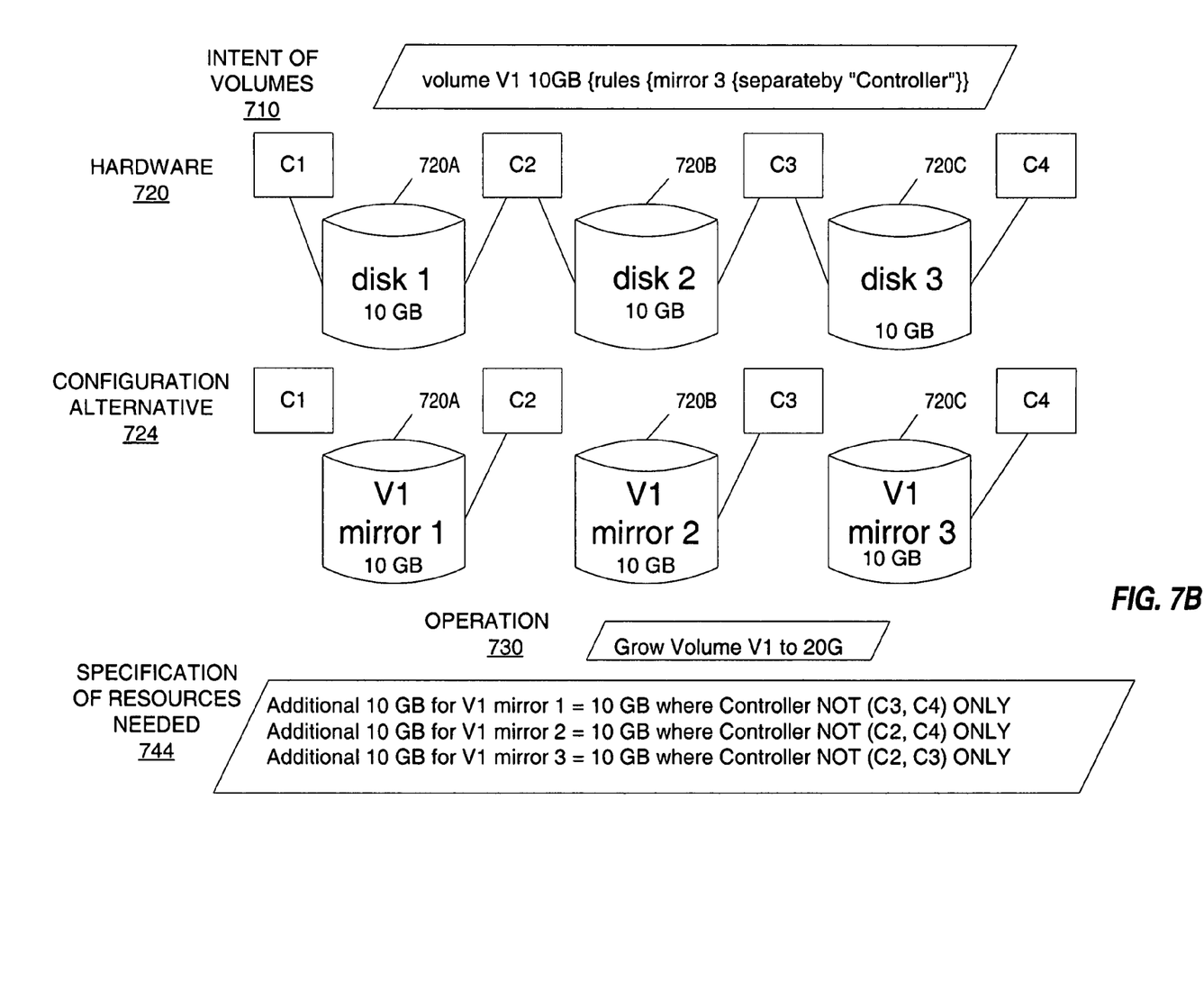

FIGS. 7A and 7B show an example of alternative specifications of resources to perform one operation. Hardware 720 includes three 10 gigabyte disks, 720A, 720B, and 720C, and four controllers C1, C2, C3, and C4. Disk 720A is accessible via controller C1 or C2, disk 720B is accessible via controller C2 or C3, and disk 720C is accessible via controller C3 or C4. In FIG. 7A configuration alternative 722, disk 720A hosts V1 mirror 1, which is made available via controller C1, disk 720B hosts V1 mirror 2, which is made available via controller C2, and disk 720C hosts V1 mirror 3, which is made available via controller C3. Operation 730 requests to increase the size of volume V1 to 20 gigabytes. The controller configurations are reflected in Specification of Resources Needed 742, where the additional 10 gigabytes for V1 mirror 1 can be made available on controllers other than controllers C2 or C3 only, the additional 10 gigabytes for V1 mirror 2 can be made available on controllers other than controllers C1 or C3 only, and the additional 10 gigabytes for V1 mirror 3 can be made available on controllers other than controllers C1 or C2 only.

In FIG. 7B configuration alternative 724, disk 720A hosts V1 mirror 1, which is made available via controller C2, disk 720B hosts V1 mirror 2, which is made available via controller C3, and disk 720C hosts V1 mirror 3, which is made available via controller C4. Operation 730 requests to increase the size of volume V1 to 20 gigabytes. The controller configurations are reflected in Specification of Resources Needed 744, where the additional 10 gigabytes for V1 mirror 1 can be made available on controllers other than controllers C3 or C4 only, the additional 10 gigabytes for V1 mirror 2 can be made available on controllers other than controllers C2 or C4 only, and the additional 10 gigabytes for V1 mirror 3 can be made available on controllers other than controllers C2 or C3 only.

Advantages of the present invention are many. The present invention uses the intent of a logical volume to identify storage that needs to be acquired to perform particular operations. The characteristics of the additional storage to be acquired are identified, along with the connectivity of the additional storage to existing storage objects in the existing logical volume. The specification of storage to be acquired can be provided as input to the storage provisioning process so that the intent of logical volumes can be maintained consistently to satisfy organizational objectives. In addition, existing storage can be preserved to be used along with the newly provisioned storage when the new storage becomes available.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    determining a first specification for a first set of needed storage regions, wherein
        the determining is performed in response to receiving a request to perform an operation on a logical volume, wherein the logical volume is created before the request to perform an operation is received,
        the first specification is based on an intent for the logical volume and the operation,
        the first set of needed storage regions is needed to perform the operation on the logical volume, and
        the first set of needed storage regions satisfies the intent of the logical volume, wherein the intent comprises an intended configuration for implementing the logical volume, and a rule is a portion of the intent associated with the logical volume;
    searching a plurality of existing storage regions for a corresponding existing storage region for each needed storage region in the first set of needed storage regions; and
    if no existing storage region is found corresponding to a first needed storage region in the first set of needed storage regions, determining a second specification for a second set of storage regions to be acquired, wherein the second set of storage regions is needed to perform the operation on the logical volume.

2. The method of claim 1 wherein the second set of storage regions to be acquired comprises at least the first needed storage region.

3. The method of claim 2 wherein the second specification for the second set of storage regions to be acquired comprises an attribute of the first needed storage region, and a connection between the first needed storage region and a storage object in the logical volume.

4. The method of claim 1 further comprising:
    using the second specification to acquire a third set of storage regions.

5. The method of claim 4 wherein
    the third set of storage regions is a subset of the second set of storage regions.

6. The method of claim 1 further comprising:
    acquiring the second set of storage regions; and
    performing the operation on the logical volume using the second set of storage regions to be acquired.

7. The method of claim 1 wherein the second set of storage regions to be acquired satisfies the intent of the logical volume.

8. The method of claim 1 further comprising:
determining a third specification, wherein the determining the third specification comprises specifying an existing storage region of the plurality of existing storage regions to reserve for performing the operation.

9. The method of claim 1 wherein the second set of storage regions to be acquired excludes a second needed storage region for which an existing storage region of the plurality of existing storage regions is found.

10. The method of claim 1 wherein
the operation comprises increasing a size of the logical volume.

11. The method of claim 1 wherein
the operation comprises evacuating data from the logical volume.

12. The method of claim 1 wherein
the operation comprises relocating data of the logical volume.

13. A system comprising:
first determining means for determining a first specification for a first set of needed storage regions, wherein
the determining is performed in response to receiving a request to perform an operation on a logical volume, wherein the logical volume is created before the request to perform an operation is received,
the first specification is based on an intent for the logical volume and the operation,
the first set of needed storage regions is needed to perform the operation on the logical volume, and
the first set of needed storage regions satisfies the intent of the logical volume, wherein the intent comprises an intended configuration for implementing the logical volume, and a rule is a portion of the intent associated with the logical volume,
searching means for searching a plurality of existing storage regions for a corresponding existing storage region for each needed storage region in the first set of needed storage regions, and
second determining means for determining a second specification for a second set of storage regions to be acquired if no existing storage region is found corresponding to a first needed storage region in the first set of needed storage regions, wherein
the second set of storage regions is needed to perform the operation on the logical volume; and
a processor, coupled to control and configured to perform the functions of the first determining, searching and second determining means.

14. The system of claim 13 further comprising:
using means for using the second specification to acquire a third set of storage regions.

15. The system of claim 14 wherein the third set of storage regions is a subset of the second set of storage regions to be acquired.

16. The system of claim 13 further comprising:
acquiring means for acquiring the second set of storage regions to be acquired; and
performing means for performing the operation on the logical volume using the second set of storage regions to be acquired.

17. The system of claim 13 further comprising:
third determining means for determining a third specification, wherein the determining the third specification comprises specifying an existing storage region of the plurality of existing storage regions to reserve for performing the operation.

18. A system comprising:
a first determining module configured to determine a first specification for a first set of needed storage regions, wherein
the determining is performed in response to receiving a request to perform an operation on a logical volume, wherein the logical volume is created before the request to perform an operation is received,
the first specification is based on an intent for the logical volume and the operation,
the first set of needed storage regions is needed to perform the operation on the logical volume, and
the first set of needed storage regions satisfies the intent of the logical volume, wherein the intent comprises an intended configuration for implementing the logical volume, and a rule is a portion of the intent associated with the logical volume,
a searching module configured to search a plurality of existing storage regions for a corresponding existing storage region for each needed storage region in the first set of storage regions, and
a second determining module configured to determine a second specification for a second set of storage regions to be acquired if no existing storage region is found corresponding to a first needed storage region in the first set of needed storage regions, wherein
the second set of storage regions is needed to perform the operation on the logical volume; and
a processor, coupled to control and configured to perform the functions of the stored modules.

19. The system of claim 18 wherein the second set of storage regions to be acquired comprises at least the first needed storage region.

20. The system of claim 18 wherein the second specification for the second set of storage regions to be acquired comprises
an attribute of the first needed storage region, and
a connection between the first needed storage region and a storage object in the logical volume.

21. The system of claim 18 further comprising:
an acquiring module configured to acquire the second set of storage regions to be acquired; and
a performing module configured to perform the operation on the logical volume using the second set of storage regions to be acquired.

22. The system of claim 18 further comprising:
a third determining module configured to determine a third specification, wherein the determining the third specification comprises specifying an existing storage region of the plurality of existing storage regions to reserve for performing the operation.

23. A computer-readable storage medium, wherein the storage medium is not a signal, comprising:
first determining instructions configured to determine a first specification for a first set of needed storage regions, wherein
the determining is performed in response to receiving a request to perform an operation on a logical volumes wherein the logical volume is created before the request to perform an operation is received,
the first specification is based on an intent for the logical volume and the operation,
the first set of needed storage regions is needed to perform the operation on the logical volume, and
the first set of needed storage regions satisfies the intent of the logical volume, wherein the intent comprises an intended configuration for implementing the logical volume, and a rule is a portion of the intent associated with the logical volume;

searching instructions configured to search a plurality of existing storage regions for a corresponding existing storage region for each needed storage region in the first set of needed storage regions; and second determining instructions configured to determine a second specification for a second set of storage regions to be acquired if no existing storage region is found corresponding to a first needed storage region in the first set of needed storage regions, wherein the second set of storage regions is needed to perform the operation on the logical volume.

24. The computer-readable storage medium of claim 23 wherein the second set of storage regions to be acquired comprises at least the first needed storage region.

25. The computer-readable storage medium of claim 23 wherein the second specification for the second set of storage regions to be acquired comprises an attribute of the first needed storage region, and a connection between the first needed storage region and a storage object in the logical volume.

26. The computer-readable storage medium of claim 23 further comprising:

acquiring instructions configured to acquire the second set of storage regions to be acquired; and performing instructions configured to perform the operation on the logical volume using the second set of storage regions to be acquired.

27. The computer-readable storage medium of claim 23 further comprising:

third determining instructions configured to determine a third specification, wherein the determining the third specification comprises specifying an existing storage region of the plurality of existing storage regions to reserve for performing the operation.

\* \* \* \* \*